Patented Nov. 14, 1939

2,179,800

UNITED STATES PATENT OFFICE 2,179,800

PROCESS OF PRODUCING CONDENSATION PRODUCTS HAVING TANNING ACTION

Hermann Schuette, Mannheim, Germany, assignor to I. G. Farbenindustrie Aktiengesellschaft, Frankfort-on-the-Main, Germany No Drawing. Application July 1, 1938, Serial No. 216,963. In Germany July 17, 1937

6 Claims. (Cl. 260—457)

The present invention relates to a process of producing condensation products having tanning action from dihydroxy sulphones.

I have found that high quality condensation products having tanning action can be obtained in a simple manner by condensing dihydroxydiphenylsulphones at elevated temperatures with glycollic acid while employing sulphonating agents.

Suitable initial materials for the said process are for example 4,4'-dihydroxydiphenylsulphone, 4,4'-dihydroxy - 3,3' - dimethyldiphenylsulphone, 2,2'dihydroxydiphenylsulphone, and sulphones of the said kind which are substituted by halogen atoms, carboxyl, ester or amino groups, such as 4,4'-dihydroxy-3,3'-dibromodiphenylsulphone and the like. The glycollic acid is used, for example, in amounts of from about ½ to 1½ molecular proportions for each molecular proportion of the sulphone.

As sulphonating agents there may be mentioned for example concentrated sulphuric acid, oleum and chlorsulphonic acid; these may be used in amounts of from about 1 to 2 molecular proportions for each molecular proportion of the sulphone in the presence or absence of diluents, water-binding acids, acid anhydrides or other agents favoring the sulphonation or condensation. The temperature at which the condensation is carried out is generally speaking above 100° C. and it is preferable to work between 120 and 160° C. Temperatures which are too high must be avoided in order to prevent a decomposing effect of the sulphonating agent on the initial material or on the condensation product. Under the said working conditions there usually takes place at from about 140 to 160° C. a strong reaction with frothing, which is led to its end by subsequent heating of the reaction mixture.

For example by reacting glycollic acid with dihydroxydiphenylsulphone with an addition of concentrated sulphuric acid at elevated temperature, preferably at temperatures of from 130 to 160° C., there takes place in a surprisingly short time, simultaneously with the sulphonation of the dihydroxydipenylsulphone, the condensation of the sulphonic acid formed with the glycollic acid. The initial materials are preferably so measured that for each molecular proportion of dihydroxydiphenylsulphone there are from 1 to two molecular proportions of sulphuric acid and from ½ to 1 molecular proportion of glycollic acid.

The condensation products obtained yield, in the tanning of animal hides, white leather of pleasant touch, uniform grain and excellent fastness to light. They are therefore especially suitable for the production of upper leathers, portfolio and furniture leathers stable to light and for tanning reptile hides in which the maintenance of the shade of color and the fineness of the markings is of special importance. They may be used with advantage together with vegetable tanning agents, as for example sumach or gall nut extract, or also together with synthetic tanning agents, as for example the products obtainable according to the United States Patents Nos. 1,414,045, 1,421,722 and 2,038,529. The products obtained in the present case influence very favorably the color of the leather obtained by chrome tanning.

The following example will further illustrate the nature of this invention but the invention is not restricted to this example. The parts are by weight.

Example 100 parts of 4,4'-dihydroxydiphenylsulphone are heated to from 130 to 140° C. whereupon, while stirring, there is added a heated solution of 16 parts of crystallized glycollic acid in 40 parts of concentrated sulphuric acid. The temperature of the mixture is then raised to from 150 to 160° C., whereby the reaction proceeds with complete liquefaction and foaming. The reaction mixture is kept at the said temperature until a sample thereof is soluble in water, for which purpose from about 25 to 40 minutes are necessary. The whole is then allowed to cool from about 70 to 90° C., diluted with warm water, allowed to cool completely and filtered from small amounts of undissolved constituents. The filtrate is adjusted to the usual acidity with caustic soda solution. When importance is attached to a tanning agent free from ash, ammonia may be used instead of caustic soda solution.

A strongly diluted aqueous solution of the resulting product gives an intense Bordeaux red coloration with 1 per cent aqueous ferric chloride solution.

Instead of 4,4'-dihydroxydiphenylsulphone, there may also be used 4,4'-dihydroxy-3,3'-dimethyldiphenylsulphone or 4,4'-dihydroxy-3,3' dibromodiphenylsulphone. Tanning products having similar properties are thus obtained.

What I claim is:

1. The process of producing condensation products having tanning action, which comprises causing a dihydroxy-diphenylsulphone at a temperature range of between 100 and 160° C. to react with glycollic acid in the presence of a sulphonating agent.

2. The process of producing condensation products having tanning action, which comprises causing a 4,4'-dihydroxydiphenylsulphone at a temperature range of between 100 and 160° C. to react with glycollic acid in the presence of a sulphonating agent.

3. The process of producing condensation products having tanning action, which comprises causing a dihydroxydiphenylsulphone at a temperature range of between 100 and 160° C. to react with glycollic acid in the presence of a sulphonating agent.

4. The process of producing condensation products having tanning action, which comprises causing a dihydroxydiphenylsulphone at a temperature range of between 100 and 160° C. to react with glycollic acid in the presence of concentrated sulphuric acid.

5. As a new product having tanning action obtainable by condensing a dihydroxydiphenylsulphone with glycollic acid in the presence of a sulphonating agent.

6. As a new product having tanning action obtainable by condensing 4,4'-dihydroxydiphenylsulphone with glycollic acid in the presence of a sulphonating agent.

HERMANN SCHUETTE.